April 9, 1957 G. J. GIEL ET AL 2,788,470

VARIABLE COMPOSITE ELECTRONIC APPARATUS

Filed Aug. 17, 1953 2 Sheets-Sheet 1

George J. Giel,
Deryl K. Kinsey, INVENTORS.

BY

Attorney

VARIABLE COMPOSITE ELECTRONIC APPARATUS

Filed Aug. 17, 1953

2 Sheets-Sheet 2

George J. Giel,
Deryl K. Kinsey, INVENTORS.
BY
Attorney

United States Patent Office 2,788,470

Patented Apr. 9, 1957

2,788,470

VARIABLE COMPOSITE ELECTRONIC APPARATUS

George J. Giel, Venice, and Deryl K. Kinsey, Sherman Oaks, Calif., assignors to Audio Products Corporation, Los Angeles, Calif., a corporation of California Application August 17, 1953, Serial No. 374,792

2 Claims. (Cl. 317—101)

The present invention relates generally to electronic apparatus, and is more particularly concerned with the provision of a plurality of highly flexible prefabricated electrically and mechanically compatible units which are easily assembled and electrically interconnectable to form a variety of composite devices.

Considered in the light of its broad concepts, it is an object of the present invention to provide what might be termed an "electronic tool" which will relieve skilled and creative engineers of the concern with the design and development of more-or-less standard circuits, such as amplifiers, pulse-formers, binaries, electronic counters, gates, frequency dividers and the like, and permit concentration on specialized-function circuits or an entire system. In other words, the engineers, by utilizing the herein described invention, can think and operate in terms of "block diagrams," and are thus freed of circuitry details.

For example, an engineer concerned with the development of any pulse operated device treats all elements as "blocks" in his initial consideration and thinking. The present invention provides flexible ready means by which valuable time may be saved by the elimination of expensive breadboard constructions, long delays and waiting for designs and technicians to build a required apparatus for the purpose of testing the engineer's concepts. By assembling the units and interconnecting them according to simple instructions, the desired apparatus may be quickly assembled and utilized.

Similarly, electronic laboratories by utilizing the present invention may quickly assemble highly specialized devices which may be vitally and immediately required for one experiment, but which will in many cases not be required again in the perceivable future. However, should it be necessary to repeat the experiment, the reassembly and interconnection of the units may be quickly and accurately repeated.

The utilization of standardized prefabricated units, provides data which will permit subsequent reduction of the concept or system to a permanent basis.

Having in mind the foregoing advantages and features, it is a further object of the herein described invention to provide a plurality of prefabricated units for assembly into composite electronic devices, these units being standardized and interchangeable with respect to their physical relation in the assembled device, means being provided for mechanically interlocking the assembled devices, and the electrical connecting means being disassociated, that is, terminals for the signal and circuit interconnections being provided on the front panels of the units, while power connections are arranged on the back panels of the units.

Another object is to provide prefabricated components in which a panel mounting for the component parts of the particular circuits characteristic of the unit are mounted on the panel, and the panel is so arranged that when a plurality of units are vertically stacked, free flow of air is permitted through the units over the component parts thereof for cooling purposes, whereby hot spots are eliminated.

A still further object is to provide a skeletal framework chassis which permits ready accessibility to the wiring circuits of the individual units and the circuit components embodied therein.

Still another object is to provide unique mechanically interlocking means for releasably interconnecting the assembled units so as to form a mechanically rigid composite construction.

Further objects of the invention will be brought out in the following part of the specification, wherein detailed description is for the purpose of fully disclosing the invention without placing limitations thereon.

Referring to the accompanying drawings, which are for illustrative purposes only:

Figures 1, 2, 8, 9:
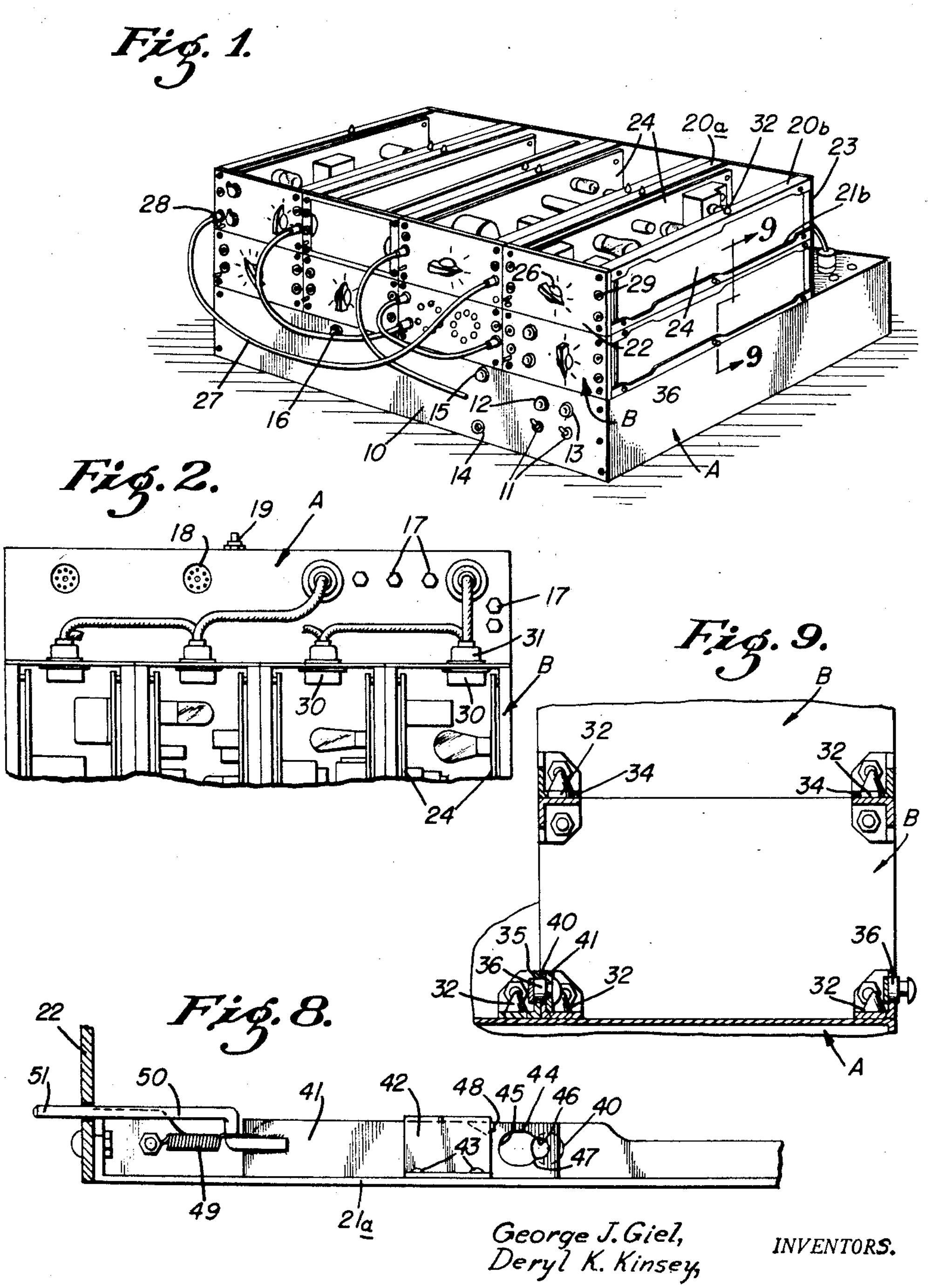
Fig. 1 is a perspective view of electronic apparatus embodying the features of the present invention.
Fig. 2 is an enlarged fragmentary plane view illustrating the manner of interconnecting certain of the units with the power source at the rear end walls of the units.
Fig. 8 is a fragmentary view showing details of construction of one of the mechanical locking devices as used on the units; a section being taken substantially on line 8—8 of Fig. 6.
Fig. 9 is a fragmentary sectional view showing the mechanically interlocking and aligning means between the units, a section being taken substantially on line 9—9 of Fig. 1.

Referring now to the drawings, for illustrative purposes, there is shown in Fig. 1 electronic apparatus embodying the present invention. In general the apparatus comprises a plurality of prefabricated standardized units, one of these units as indicated at A being of generally rectangular box-like construction and of larger dimensions than units B which are assembled upon unit A as a bottom or base forming unit.

Unit A is a power pack unit containing the necessary components to provide required potential sources, as well as control and protective devices. As an exemplary illustration, the unit A has a forward or front panel 10 upon which control toggle switches 11 are mounted together with an indicating lamp 12 to show when the power is on, and an indicating lamp 13 to show when the high voltage circuit of the power supply is energized. A readily replaceable protective fuse is shown at 14, while an overload indicating lamp is identified by the numeral 15. A reset push button 16 is also provided on unit A for resetting the assembled device or system.

At the rear of unit A, binding posts 17 are arranged to permit connection of the power supply potentials to other devices than the composite device which consists of the assembled units B. The potential sources for units B are brought out through multiconnector female receptacles 18 which are mounted in the upper rear surface of the power supply unit A. An adjustable potentiometer, as shown at 19 is mounted in the rear wall of the power supply unit, for convenient accessibility in making required adjustments for overload-low line voltage.

Units B are constructed of standard size and provide a highly flexible set of electrically and mechanically compatible units which may be easily assembled and interconnected by patch cords to provide a composite electronic device. These units are prefabricated and individually embody the necessary components and characteristic circuits to provide desired functional operations in the building up of a composite electronic device. For example, types of units which may be provided are frequency dividers; electronic gate and switch control; amplifiers; diode clipper, threshold and bridge circuits; binary; amplifier; cathode follower; trigger; timing pulse generator; anti-coincidence; pulse delay; decade counter; passive circuits elements; pulse-formers; and the like.

The units B are of standard size, and as shown in Figs. 1 and 2 are of less length than the unit A, and are of such width that several of the units may be horizontally aligned and assembled in abutting relation across the width of the unit A, as well as vertically stacked, as shown.

Each unit B contains the required circuit components such as vacuum tubes, capacitors, inductors, resistors, transformers, etc., as may be required for the characteristic circuits and electrical functioning of the unit. However, there are certain basic common characteristics of the units which permit their utilization as component units in the construction of composite electronic instruments and devices. More specifically, the units are of standard dimensions and embody a framework structure of skeletal form, each unit embodying spaced upper rails 20*a* and 20*b*, and lower spaced rails 21*a* and 21*b*. The rails are secured to a forward end panel 22 and a rearward end panel 23 to form a substantially rectangular box-like frame structure of skeletal form, the frame being open on its top, bottom and sides.

More specifically, the details of construction of a representative unit B are most clearly shown in Figs. 3 to 7 inclusive and will now be described in detail as representative of the construction of units B.

It will be appreciated, of course, that the circuit components and devices of each unit B will depend upon the circuit characteristics and functional operations of the component unit. In each case, the vacuum tubes, capacitors, transformers, resistors and other required circuit components will be mounted upon one or more base panels 24, as required. However, it is one feature of the invention that these panels shall be mounted vertically. In the present instance the panels are shown as being secured adjacent the sides of the framework structure and held in mounted position by means of suitable mounting bolts 25. With this arrangement, the circuit components project inwardly, and it will be appreciated that when a number of units B are stacked to form vertical rows, as shown in Fig. 1, the panels 24 of the respectively stacked units cooperate to form in effect a vertical duct or flue for the flow of cooling air over the circuit components, thus preventing the occurrence of hot spots.

In many circuits, the units are arranged for varied operational functions by providing appropriate switches. Such switches are mounted on the front panels 22 as indicated by the numeral 26 so as to be convenient for ready adjustment and changes.

Another characteristic of the invention is that provision is made for interconnecting the various units, as required to form the composite circuitry of the desired electronic device. The interconnections between the units is accomplished by means of conductors, generally termed patchcords, as indicated at 27, these cords being fitted at their ends with male plugs 28 adapted to be plugged into complementary circuit terminal female receptacles 29 mounted upon the forward end panels 22 of the various units B. Thus by utilization of the patchcords, the units B may have their circuits interconnected in appropriate manner to effect a composite circuit of the desired electronic instrument or device. Moreover, these interconnections between the unit circuits are accomplished on the forward side of the assembled units.

In order to lessen the possibility of error, the power supply connections to the respective units B are accomplished on the back side or at the rear of the assembled units. Each of the panels 23 has mounted thereon a female plug 30 adapted to receive a male plug 31. As shown in Fig. 2, multi-plug connectors are provided by which each female receptacle 18 of the power supply unit A may be connected to a plurality of units B. With this arrangement, the power supply connections are segregated from the intercircuit connections of the units B.

Having described the electrical interconnection means for the units A and B, the mechanical means for aligning and interlockingly interconnecting the units will now be described. As shown in Figs. 3 to 7, the upper rails 20*a* and 20*b* of each unit B are provided intermediate their ends with an upstanding pin 32 which is tapered to form a pointed end 33. Directly below the pins 32, the lower rails 21*a* and 21*b* are provided with apertures 34 which are in vertical axial alignment with the pins 32 and of a size to permit the entrance of pins into the apertures so as to align vertically stacked units B. In the case of unit A, the upper surface of this unit is provided with pairs of spaced pins 32, the spacing of each pair corresponding with the aperture spacing for the units B so as to position these units on the top of unit A when a plurality of such units are placed in side by side abutting position to form a horizotnal row across the top of unit A. Thus the coaction of the pins 32 and pin receiving apertures 34 relatively position the assembled units with their front and rear end panels in flush relation.

Figures 3, 4, 5, 6, 7:
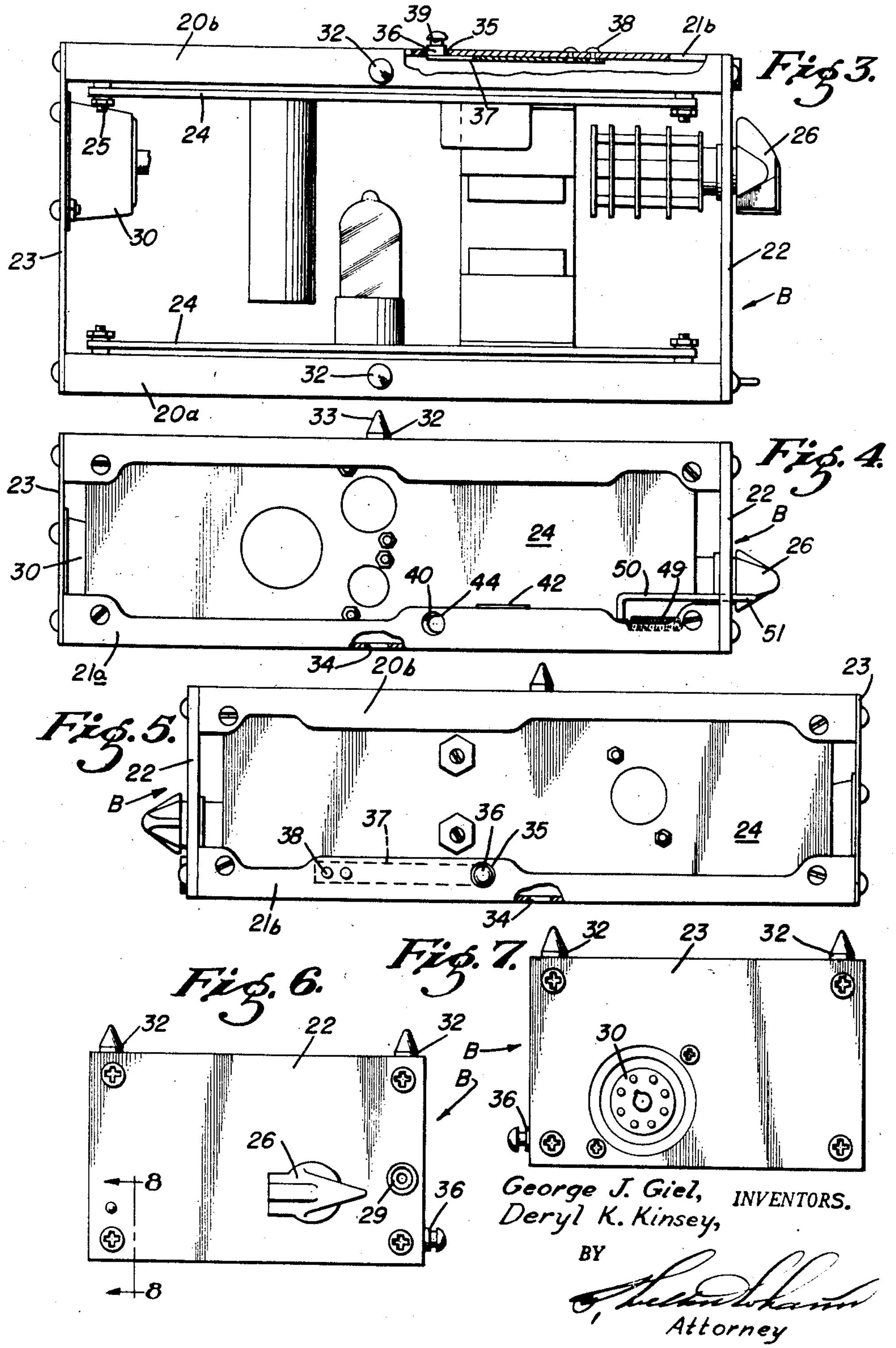
Fig. 3 is an enlarged plane view of one of the prefabricated units showing the mounting panels therein for characteristic circuit components, and having cutaway portions showing details of one of the connection parts.
Fig. 4 is a side elevational view of the same.
Fig. 5 is a side elevational view of the side opposite that shown in Fig. 4.
Fig. 6 is a front end elevational view of the unit.
Fig. 7 is a rear end elevational view.

Provision is also made for interlockingly interconnecting the abutting sides of adjacent units B. As shown in Figs. 3 and 5, the lower rail 21*b* of each unit has a side opening 35 therein through which projects a stud or pin 36 which is resiliently supported by being secured at one end of a leaf spring 37 having its other end anchored as by rivets 38 to the rail member. The projecting end of the pin 36 is provided with a groove 39 so as to define a head portion on the pin for cooperation with an interlocking mechanism as will hereinafter be described.

As shown in Figs. 4 and 8, the lower rail 21*a* of the unit B framework is provided with a side opening 40 which is in horizontal axial alignment with the opening 35, and of such size as to permit the insertion of the head portion of a pin 36 of an abutting adjacently positioned unit B therein.

As more clearly shown in Fig. 8, means are provided for locking a pin 36 against withdrawal from the opening 40. For such purpose, a locking bar 41 is supported in edgewise position on the rail 21*a* by means of a retaining clip 42 which is anchored as by rivets 43. As thus mounted, the locking bar is axially slidable. Adjacent the end of locking bar 41 which is positioned near the side opening 40, the bar is provided with a slot 44 having a portion 45 of such size as to register with the opening 40, when the bar is moved towards the right from the position as shown in Fig. 8. The slot 44 also has on its opposite end a portion 46 of contracted size so that when the locking bar is in the position shown, the contracted portion defines edges 47 which are adapted to move into the groove 39 of an inserted pin 36, thus holding the pin in locked position. Movement to the left of the bar 41 is limited by a stop 48 which is adapted to abut the retaining clip 42.

The bar 41 is biased towards the left to a locking position by means of a tensioned coil spring 49 having a connection at one end with the bar and at its other end being anchored to the rail 21*a*. In order to permit manual movement of the locking bar 41 to an unlocked position, the bar is provided at the end adjacent panel 22 with a rod extension 50 which extends through a suitable opening in the panel 22 and has an end 51 positioned forwardly of the panel 22 where it may be easily manually manipulated to move the locking bar to unlocked position, when desired.

The mechanical interconnection of the unit A with assembled units B thereon, and between the units B is illustrated in Fig. 9. It will be apparent that the pins 32 act to vertically align the stacked units B and position these units on the unit A, whereas pins 36 are interlocked with adjacently positioned units by means of the locking bars 41 so as to form an interlocked composite assembly of units in the desired instruments or electronic device.

Various modifications may suggest themselves to those skilled in the art without departing from the spirit of our invention, and, hence, we do not wish to be restricted to the specific form shown or uses mentioned, except to the extent indicated in the appended claims.

We claim:

1. Electronic apparatus, comprising: a plurality of individual box-like prefabricated units, one of said units constituting a power source unit of greater front to back depth than the other units, and a width corresponding with a plurality of said other units when variously assembled on the power unit as a base with their fronts in flush relation to form a composite device; electrical components in each of said other units connected into a circuit characteristic of the unit; terminals on the fronts of said other units connected with the circuits therein; power supply terminals on the backs of said other units; terminals carried by the rear portion of the power unit; conductor connectors for connecting the power supply terminals of said other units with the terminals of said power unit; patchcords adapted to interconnect terminals on the fronts of said other units; and means mechanically positioning and interlocking said units in assembled relation.

2. Electronic apparatus, comprising: a plurality of individual box-like prefabricated units, one of said units constituting a power source unit of greater front to back depth than the other units, and of a width corresponding with a plurality of said other units when variously assembled on the power unit as a base with their fronts in flush relation; electrical components in each of said other units connected into a circuit characteristic of the unit; terminals on the fronts of said other units connected with the circuits therein; power supply terminals on the backs of said other units; terminals carried by the rear portion of the power unit; conductor connectors for connecting the power supply terminals of said other units with the terminals of said power unit; and patchcords adapted to interconnect terminals on the fronts of said other units.

References Cited in the file of this patent

UNITED STATES PATENTS

| | | |
|---|---|---|
| 2,411,528 | Dodington | Nov. 26, 1946 |
| 2,428,322 | Robertson | Sept. 30, 1947 |
| 2,471,011 | Shapiro | May 24, 1949 |
| 2,515,638 | Doucette | July 18, 1950 |
| 2,602,842 | Morris | July 8, 1952 |

OTHER REFERENCES

Radio Craft for January 1939. Pages 400, 401 and 431.